(12) United States Patent
Regazzoni et al.

(10) Patent No.: US 6,935,468 B2
(45) Date of Patent: Aug. 30, 2005

(54) CALIPER FOR A DISK BRAKE AND SUPPORT ELEMENT FOR A CALIPER FOR A DISK BRAKE

(75) Inventors: Mattia Regazzoni, Ponteranica (IT); Giancarlo Vezzoli, Chiari (IT)

(73) Assignee: Freni Brembo S.p.A., Curno (IT)

(*) Notice: Subject to any disclaimer, the term of this patent is extended or adjusted under 35 U.S.C. 154(b) by 0 days.

(21) Appl. No.: 10/479,595

(22) PCT Filed: Feb. 28, 2003

(86) PCT No.: PCT/IT03/00115
§ 371 (c)(1),
(2), (4) Date: Dec. 4, 2003

(87) PCT Pub. No.: WO2004/076270
PCT Pub. Date: Sep. 10, 2004

(65) Prior Publication Data
US 2004/0231932 A1 Nov. 25, 2004

(51) Int. Cl.⁷ .................................. F16D 55/00
(52) U.S. Cl. .................. 188/71.1; 188/73.31; 188/73.1
(58) Field of Search .................. 188/71.1, 73.31, 188/73.1, 73.32, 73.37, 73.39–73.43, 73.46

(56) References Cited

U.S. PATENT DOCUMENTS

| | | | |
|---|---|---|---|
| 2,894,607 A | | 7/1959 | Butler |
| 4,031,986 A | * | 6/1977 | Thompson ............... 188/73.31 |
| 5,193,833 A | | 3/1993 | Reisinger |
| 5,884,732 A | * | 3/1999 | Anger et al. ............. 188/73.31 |
| 6,302,243 B1 | * | 10/2001 | Ruiz ......................... 188/73.1 |
| 6,729,444 B1 | * | 5/2004 | Schmandt et al. ......... 188/73.1 |
| 2001/0032757 A1 | * | 10/2001 | Ballinger et al. .......... 188/71.1 |

FOREIGN PATENT DOCUMENTS

| | | |
|---|---|---|
| EP | 1 067 043 A | 1/2001 |
| GB | 2 173 268 A | 10/1986 |
| JP | 10 250667 A | 9/1998 |

* cited by examiner

*Primary Examiner*—Robert A. Siconolfi
*Assistant Examiner*—Melanie Torres
(74) *Attorney, Agent, or Firm*—Hogan & Hartson LLP (57) ABSTRACT

A caliper body suitable for co-operating with a disk of a disk brake, the body having at least one fixed body element suitable for being support element and comprising connected fixedly to a at least one central portion suitable for co-operating with elements that can accommodate at least one pad placed on a first side of the brake disk in order to exert a braking force. The central portion is located between two end portions placed beside the elements that can accommodate at least one pad, it being possible to associate the at least one fixed body element with the support element by way of securing elements which comprise first and second securing elements located substantially in a plane perpendicular to the axial direction. The first securing elements are placed on only one of the end portions, the second securing elements are placed at least partially in the central portion.

31 Claims, 7 Drawing Sheets

FIG.14

CALIPER FOR A DISK BRAKE AND SUPPORT ELEMENT FOR A CALIPER FOR A DISK BRAKE

FIELD OF THE INVENTION

The present invention relates to a caliper for a disk brake and to a support element for a caliper for a disk brake.

In particular, the present invention relates to disk brake calipers that are suitable for mounting on motorcycle forks.

BACKGROUND OF THE INVENTION

As is known, in motorcycles the calipers for disk brakes are easily exposed to impact against stones, earth and obstacles in general. This impact is extremely dangerous because it can irreparably damage the calipers and can also bring them out of alignment, for example, relative to the brake disk, causing a serious malfunction of the disk brake.

These disadvantages are particularly common when motorcycles are used on uneven ground, for example, in off-road use.

In order to overcome these disadvantages and to limit the components of the braking forces which tend to bring the caliper out of alignment with the brake disk, it is known to constrain the caliper body on its support at two points which are as far away from one another as possible, generally at the longitudinal ends of the caliper body.

In addition, caliper constructions for disk brakes are known in the prior art in which the means for securing the caliper to support elements operatively connected to the fork are disposed in planes substantially perpendicular to the axis of rotation of the wheel.

These known securing means do not, however, enable the caliper body to be placed in a position sufficiently protected from any impact.

An example of these known securing means is disclosed in JP 1130252.

In fact, the space requirements of the securing means and of the corresponding support elements, if arranged perpendicularly to the axis of rotation of the wheel, are such as to interfere with the fork itself.

This problem is even more evident in the case of brake disks having small dimensions. The need to use small brake disks is dictated by a number of reasons, such as, for example, the reduction in the risk of impact of the disk against stones and earth, the reduction in the masses that are not suspended on the front axle which has to be capable of promptly following the unevenness of the ground, and the reduction in gyroscopic effects.

On the other hand, owing to the small diameter of the disk, the caliper is even closer to the wheel spindle and both the securing means and the support elements prevent the caliper from being placed in a sufficiently protected and covered position.

The problem of the present invention is to provide a caliper for a disk brake and a support element for a caliper for a disk brake which overcome the disadvantages mentioned with reference to the prior art.

These disadvantages and limitations are overcome by a caliper according to claim 1 and by a support element according to claim 23.

Other embodiments of the caliper body and of the support element for the caliper body according to the invention are described in the following claims.

BRIEF DESCRIPTION OF THE DRAWINGS

Other characteristics and the advantages of the present invention will be understood better from the following description of some of its preferred and non-limiting embodiments, in which.

DETAILED DESCRIPTION OF THE PREFERRED EMBODIMENTS

The following description refers without distinction both to monobloc brake calipers, that is to say, calipers constructed in a single piece, and to brake calipers composed of several parts, that is to say, calipers comprising at least two half-calipers that are connected to one another by means of, for example, threaded or welded connections.

In addition, the following description refers also to calipers of the floating type, comprising a stirrup, having at least one fixed portion for its connection to a support element. The stirrup accommodates at least one pad and is operatively connected to a portion of an axially floating caliper, capable of exerting a force thrusting at least one pad against the brake disk on a side remote from the side of the disk acted upon by the stirrup.

The elements or portions of elements common to the embodiments described hereinafter will be indicated by the same reference numerals.

The expression radial direction means a direction substantially directed towards the axis of the brake disk on which the disk brake caliper is mounted in a. straddling manner.

The expression axial direction means a direction substantially parallel with the axis of rotation of the brake disk and of the wheel which can be associated therewith.

The expression tangential direction means a direction substantially parallel with a braking band of the brake disk, and also perpendicular to the radial direction and to the axial direction.

With reference to the above-mentioned drawings, 4 generally indicates a caliper unit for a disk brake, which is to brake a vehicle wheel (not shown) which is known per se.

A caliper body 8 is connected to a support element which is to be rigidly connected to a part of the suspension of a wheel.

The caliper body 8 straddles a brake disk 10 as far as a peripheral portion or braking band. The disk is also fixed for rotation with the above-mentioned wheel.

The brake disk 10 comprises a central plane P which is perpendicular to the axis of rotation of the disk and also of the wheel to which the disk is fixed for rotation.

The caliper body 8 is in turn provided with a housing 11 for the brake disk 10, the housing 11 having, a central plane R which can be superposed on the central plane P of the associated brake disk 10, that is to say, which, in a mounted configuration of the caliper body 8, straddling the brake disk 10, is superposed on the central plane P of the brake disk 10.

The caliper body 8 comprises, integrally with or connected to one another by means of threaded or welded connections, two half-calipers 12A, 12B arranged on opposite sides relative to the associated brake disk 10, each of the half-calipers 12A, 12B being suitable for accommodating at least one pad 14 for exerting a braking force on the brake disk 10.

The caliper body 8 comprises at least one fixed body element 16 suitable for being connected fixedly to a support element 100 in such a manner as to maintain a constant distance L in an axial direction parallel with the axis of rotation X of the associated brake disk 10, relative to the said brake disk 10.

According to one embodiment, the fixed body element 16 is disposed at the location of only one of the half-calipers 12A, 12B which constitute the caliper body 8. In other words, the fixed body element 16 is located on only one side of the caliper body 8 relative to the central plane R and therefore, in a mounted configuration of the caliper body, straddling the brake disk, the fixed body element 16 is located in one of the two half-spaces delimited by the central plane P of the associated brake disk 10.

Figure 1:
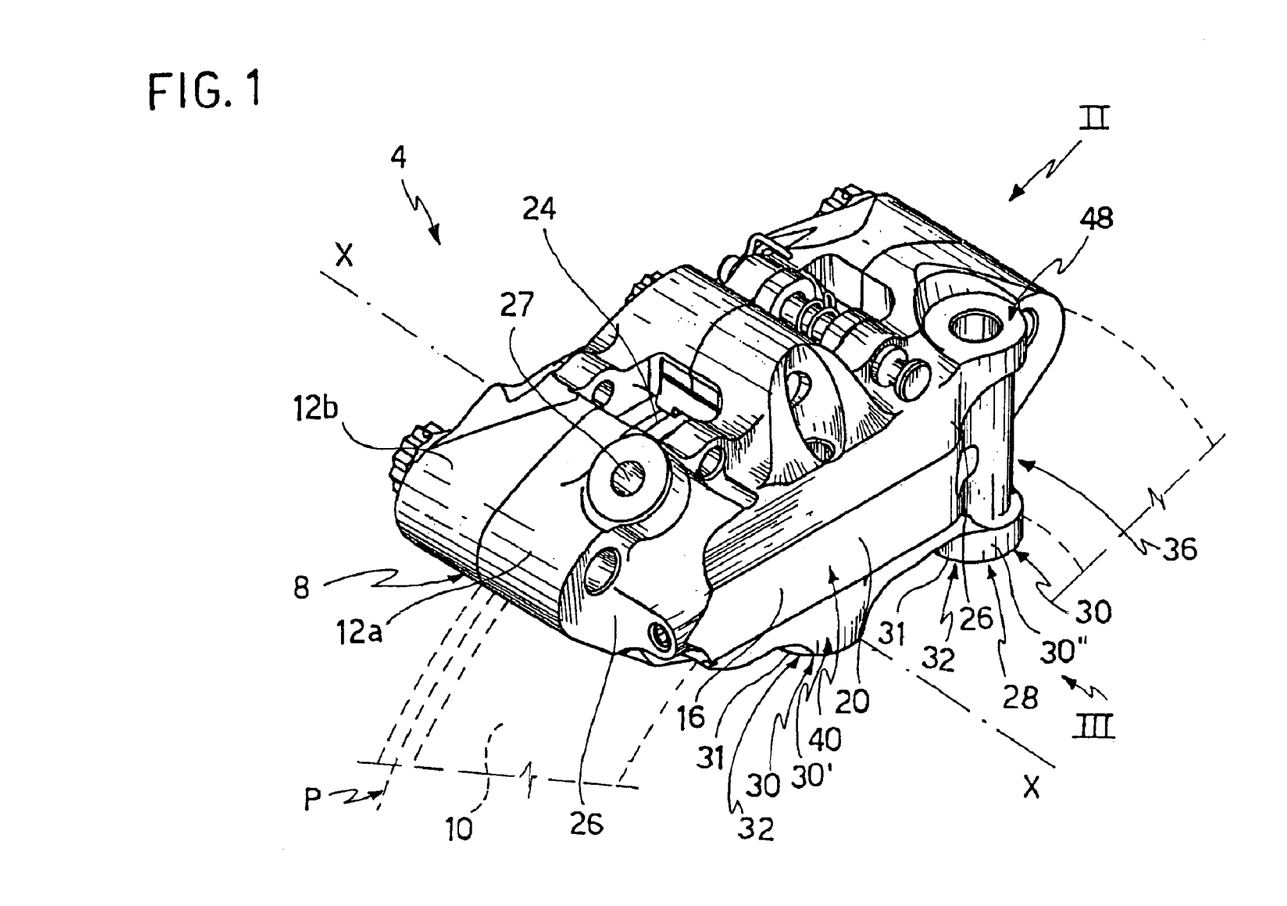
FIG. 1 is a perspective view of a caliper according to one embodiment of the invention.
Figure 2:
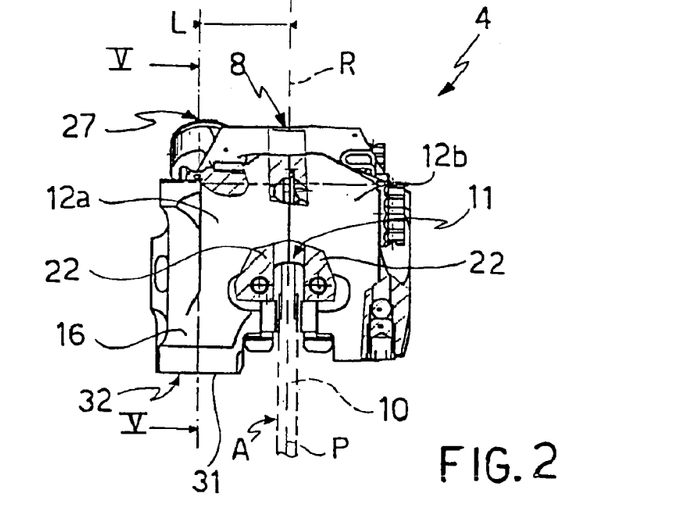
FIG. 2 is a side view of the caliper of FIG. 1 from the side indicated by the arrow II in FIG. 1.
Figure 3:
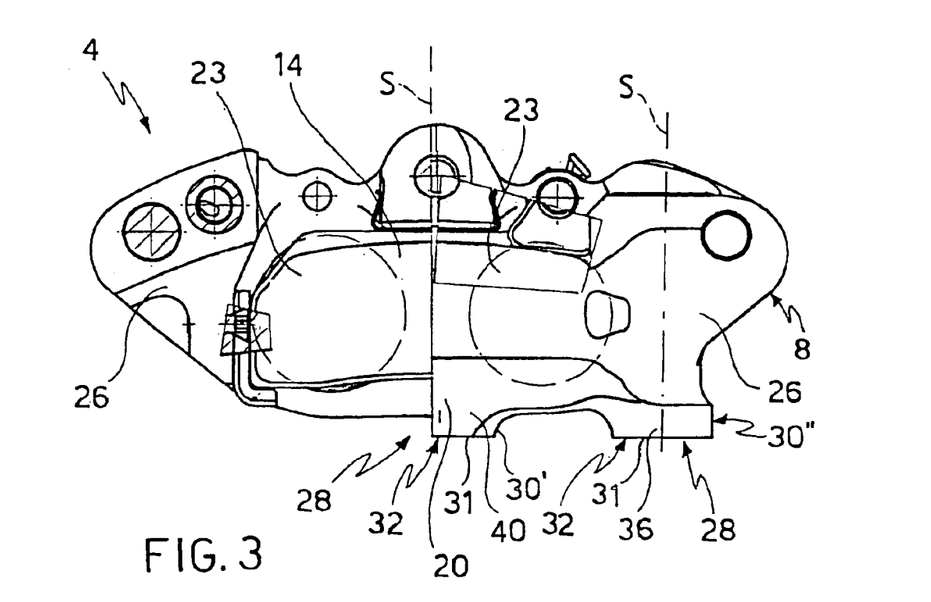
FIG. 3 is a side view of the caliper of FIG. 1 from the side indicated by the arrow III in FIG. 1.

According to one embodiment, shown, for example, in FIG. 1, the fixed body element 16 constitutes a semi-half of a fixed caliper for disk brakes.

Preferably, the fixed body element 16 comprises a central portion 20 which can co-operate with means suitable for accommodating at least one pad 22 placed on a first side A of the brake disk 10 in such a manner as to co-operate with the brake disk 10 in order to exert a braking force.

In other words, the fixed body element 16 and the at least one pad 14 are located on the same side of the associated disk relative to the central plane P and to the central plane R, for example on side A.

The central portion 20 extends predominantly tangentially, that is to say, parallel with the braking band of the brake disk 10.

At least one piston 23, for example a single-acting piston, is slidably guided in hydraulic brake cylinders which are arranged facing one another and which are formed, for example integrally, within the central portion 20 of the fixed body element 16. The central portion 20 is suitable for co-operating with means that can accommodate at least one pad 22.

According to one embodiment, the means that can accommodate at least one pad 22 comprise a housing chamber 24, extending in a tangential direction, which is arranged facing the braking band and which is suitable for accommodating at least one pad 14.

The central portion 20 is located between two end portions 26 of the fixed body element 16. According to one embodiment, the end portions 26 are placed beside the means suitable for accommodating at least one pad 22.

Figure 5:
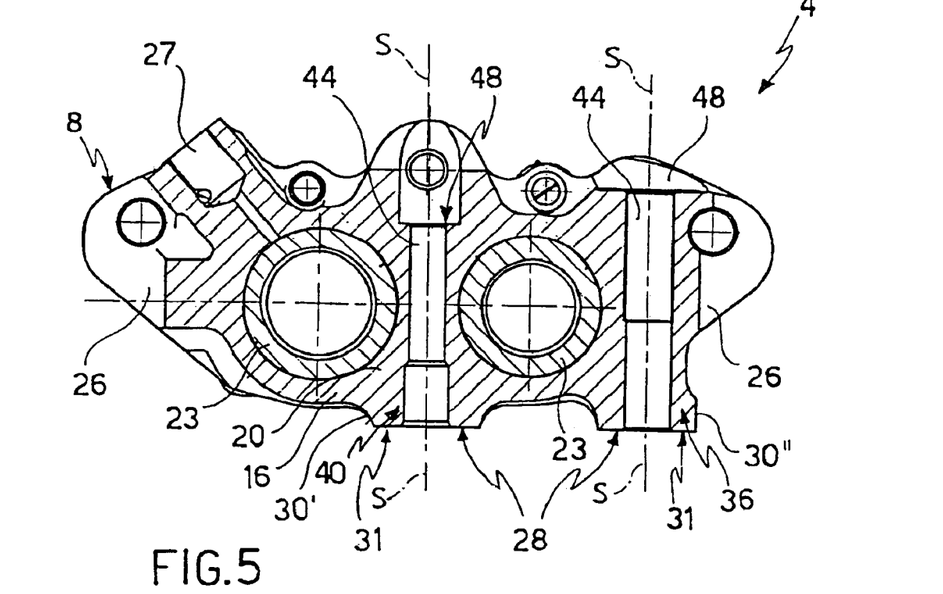
FIG. 5 is a sectioned view of the caliper of FIG. 1 along the line V—V in FIG. 2.

The end portions 26 are located on opposite sides of the central portion 20 relative to a tangential direction in such a manner as to delimit laterally the at least one piston 23. In other words, according to an embodiment shown, for example, in FIG. 5, the end portions 26 delimit tangentially the central portion 20, the at least one piston 23 with the associated cylinders and the means that can accommodate the at least one pad 22.

According to one embodiment, at the location of one of the end portions 26 of the fixed body element 16, there is a brake fluid supply duct 27 suitable for sending brake fluid placed under pressure by a master cylinder (not shown) to the caliper body and in particular to an hydraulic circuit which is connected for fluid flow to the at least one piston 23.

Preferably, the brake fluid supply duct 27 is arranged on the same half-caliper that comprises the fixed body element 16.

The at least one fixed body element 16 can be associated with the support element 100 by way of securing means 28.

According to one embodiment, the securing means 28 comprise projections 30 which are, for example, cylindrical.

Preferably, the caliper body comprises a pair of projections 30 which protrude from the fixed body element 16 in a substantially radial direction towards the axis of rotation of the brake disk 10 in such a manner that, in a mounted configuration of the caliper body 8, straddling the brake disk 10, the projections 30 face the wheel spindle.

Preferably, the pair of projections 30 is positioned in such a manner that one projection 30' protrudes from the fixed body element 16 at the location of the central portion 20 of the fixed body element 16, while one projection 30" protrudes from the fixed body element 16 at the location of an end portion 26 of the fixed body element 16.

Advantageously, the projection 30' protrudes from the central portion 20 in such a manner that, relative to a tangential direction, it is disposed between the at least one piston 23.

Advantageously, the projection 30" protrudes from one of the end portions 26 in such a manner that the projection 30" is positioned in a portion of the caliper body 8 that is not affected by the central portion 20 and by the means that can accommodate at least one pad 22.

Preferably, the projection 30" protrudes at the location of the end portion 26 not affected by the brake fluid supply duct 27, that is to say, the brake fluid supply duct 27 and the projection 30" are positioned on tangentially opposite end portions 26 of the caliper body 8.

According to one embodiment, at the location of an end facing the wheel spindle, the projections 30 comprise flat surfaces, preferably flattened portions 31, which, according to one embodiment, in a mounted configuration, are directed substantially in a tangential direction.

Advantageously, the flattened portions 31 constitute bearing planes 32 suitable for permitting, at least partially, an abutting bearing of the fixed body element 16 against corresponding counter-abutment planes of the support element 100 which are described in more detail hereinafter.

According to one embodiment, the bearing planes 32 belong to planes parallel with the axis X of rotation of the associated brake disk 10.

According to a further embodiment, the bearing planes 32 belong to the same plane parallel with the axis X of rotation of the associated brake disk 10.

According to a further embodiment, the bearing planes 32 comprise guides (not shown) suitable for producing a form-fit with corresponding portions of the support element 100 which are of a complementary shape. For example, the guides comprise grooves or, conversely, projections which extend in a tangential direction and which are suitable for producing a form-fit with corresponding complementarily shaped surfaces of support elements 100 of the caliper body 8.

The securing means 28 also comprise first securing means 36 and second securing means 40 which are advantageously located substantially in a plane perpendicular to the axial direction and to the axis of rotation X of the associated brake disk 10.

Preferably, the first and second securing means 36, 40 comprise seats 44 suitable for accommodating connecting elements, such as, for example, screws, bolts or the like, which are suitable for connecting the caliper body 8 to the support element 100.

Advantageously, the seats 44 are cylindrical seats having an axis S; preferably, the cylindrical seats 44 are through-holes which extend radially through the fixed body element 16.

Advantageously, the first and second securing means 36, 40 comprise threaded connecting means suitable for insertion into the seats 44.

It should be pointed out that "threaded connecting means" means any connection of the removable type that is characterised by the presence of at least one threaded body or screw which engages with a nut, or captive screws, lag screws or screw systems with a lock nut, bolts, washers and the like.

The first securing means 36 are advantageously located on only one of the end portions 26; in other words, only one of the end portions 26 comprises the first securing means 36.

Preferably, the first securing means 36 are located at that end portion 26 of the fixed body element 16 which is not affected by the brake fluid duct 27, that is to say, at the location of the same end portion 26 of the fixed body element 16 that comprises the projection 30".

Advantageously, the first securing means 36 are located at that end portion 26 which, in a mounted configuration of the caliper 4, straddling the brake disk 10, is the first entered by the brake disk 10 which rotates in the direction of forward travel.

Preferably, the second securing means 40 are disposed at least partially in the central portion 20, so that an end portion 26 of the caliper body, tangentially opposite the end portion 26 affected by the first securing means 36, is substantially completely cantilevered relative to the second securing means 40.

Advantageously, the second securing means 40 are disposed in the central portion 20 in such a manner that, relative to a tangential direction, they are disposed between the at least one piston 23.

Advantageously, the second securing means 40 are arranged facing the means that can accommodate the at least one pad 22.

Preferably, the second securing means 40 are contained between two planes perpendicular to the associated brake disk 10 which delimit tangentially the means that can accommodate the at least one pad 22.

Figure 10:
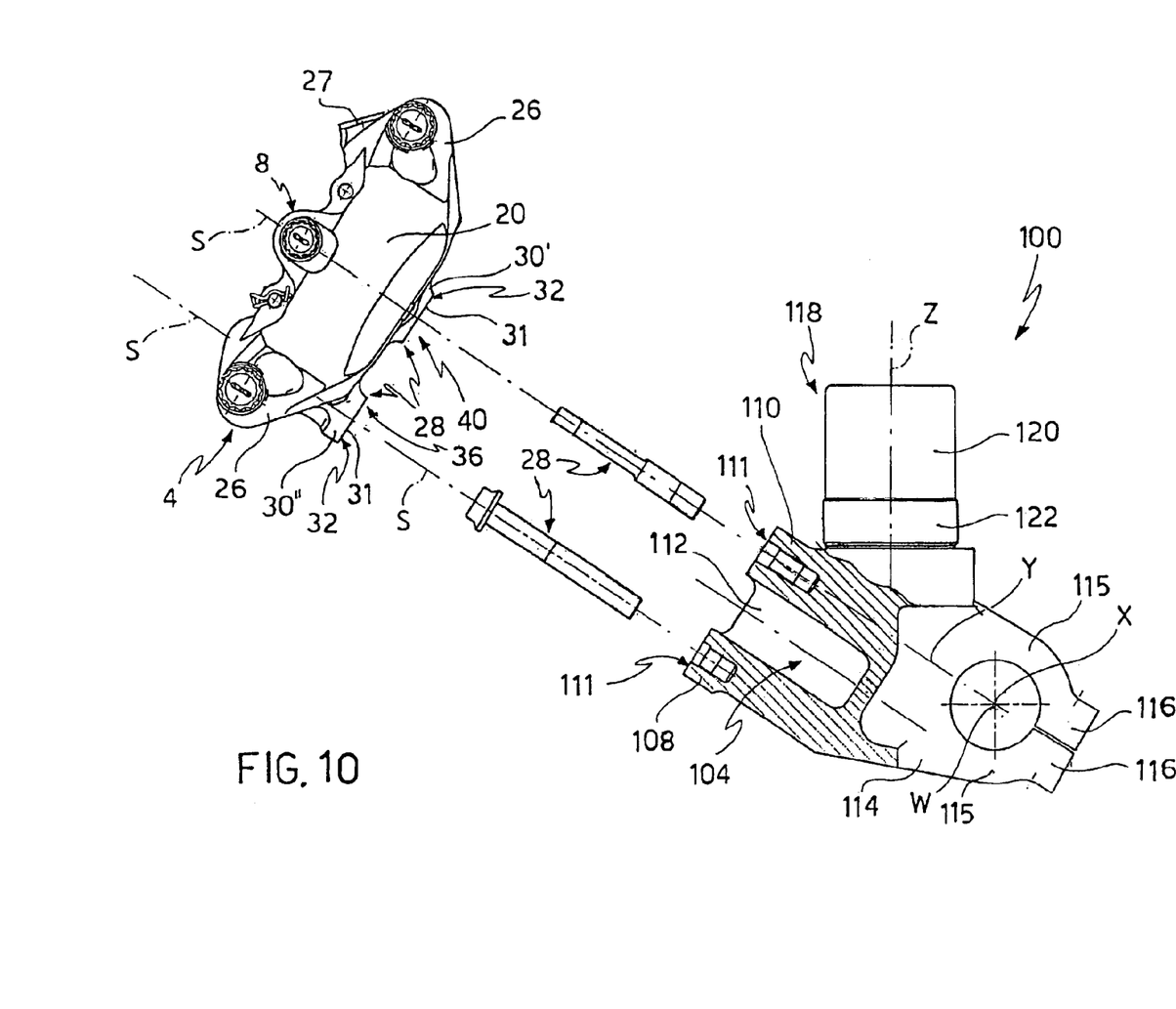
FIG. 10 is a view, with parts separated, of a caliper on a support element according to one embodiment.
Figure 11:
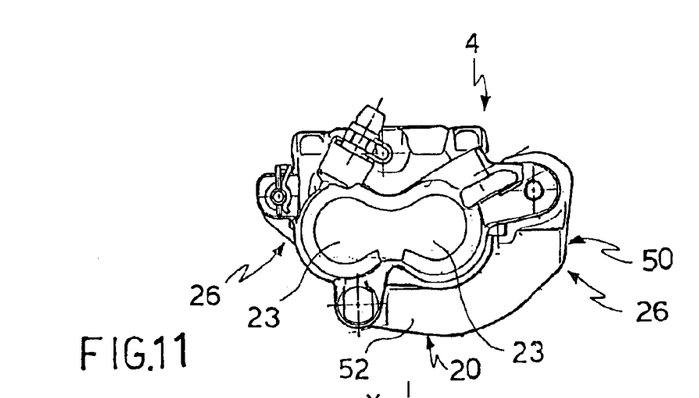
FIG. 11 is a side view of a caliper according to a further embodiment.
Figure 12:
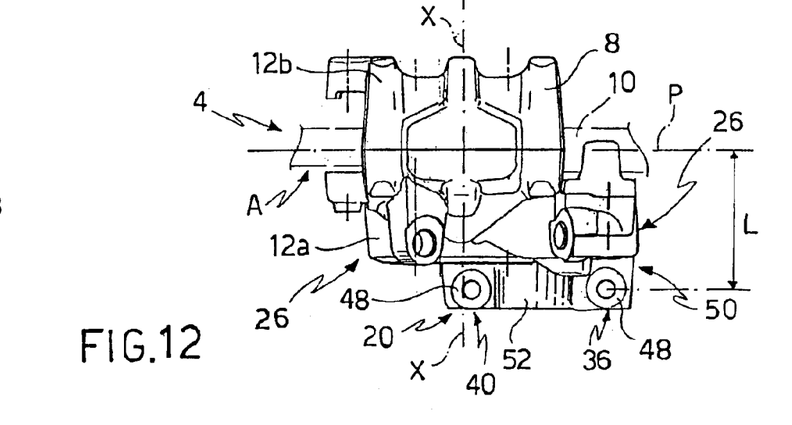
FIG. 12 is a plan view of the caliper of FIG. 11.

According to a further embodiment, shown, for example, in FIG. 10, at least one of the first and second securing means 36, 40 is disposed in a direction substantially parallel with at least one radius of the associated brake disk 10.

Figure 4:
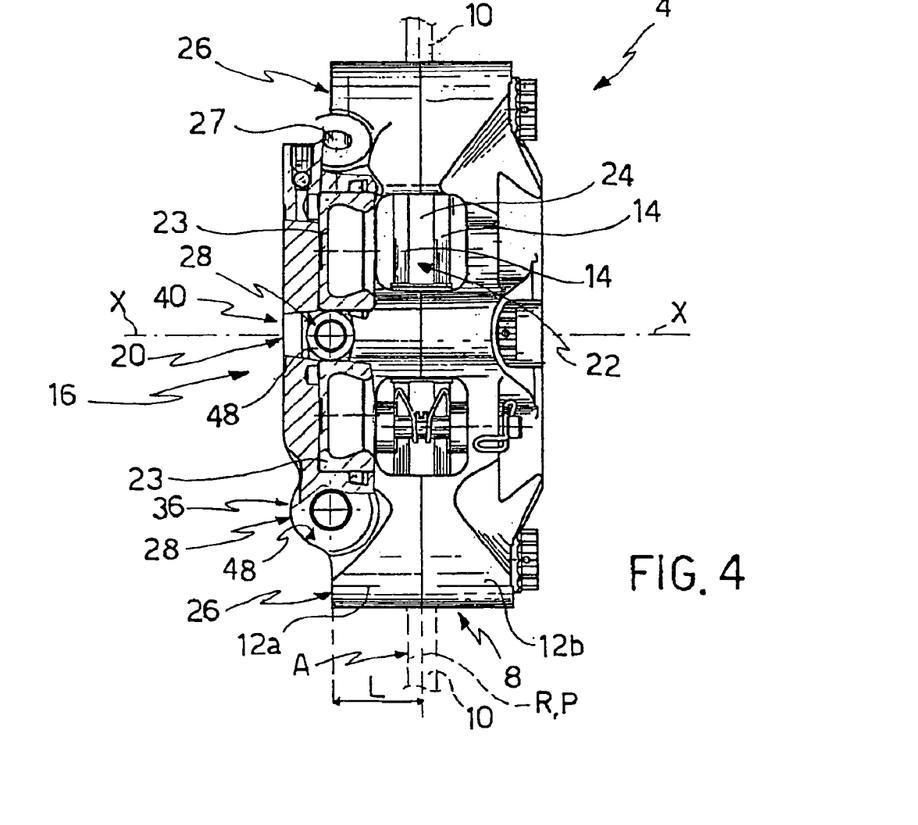
FIG. 4 is a partly sectioned plan view of the caliper of FIG. 1.

According to an advantageous embodiment, shown, for example, in FIG. 4, the axes of symmetry S of the first and second securing means 36, 40 are disposed in a plane parallel with the central plane P of the associated brake disk 10. In other words, the axes S of the seats 44 of the first and second securing means 36, 40 are aligned on a plane which is parallel with the associated brake disk 10.

Figure 6:
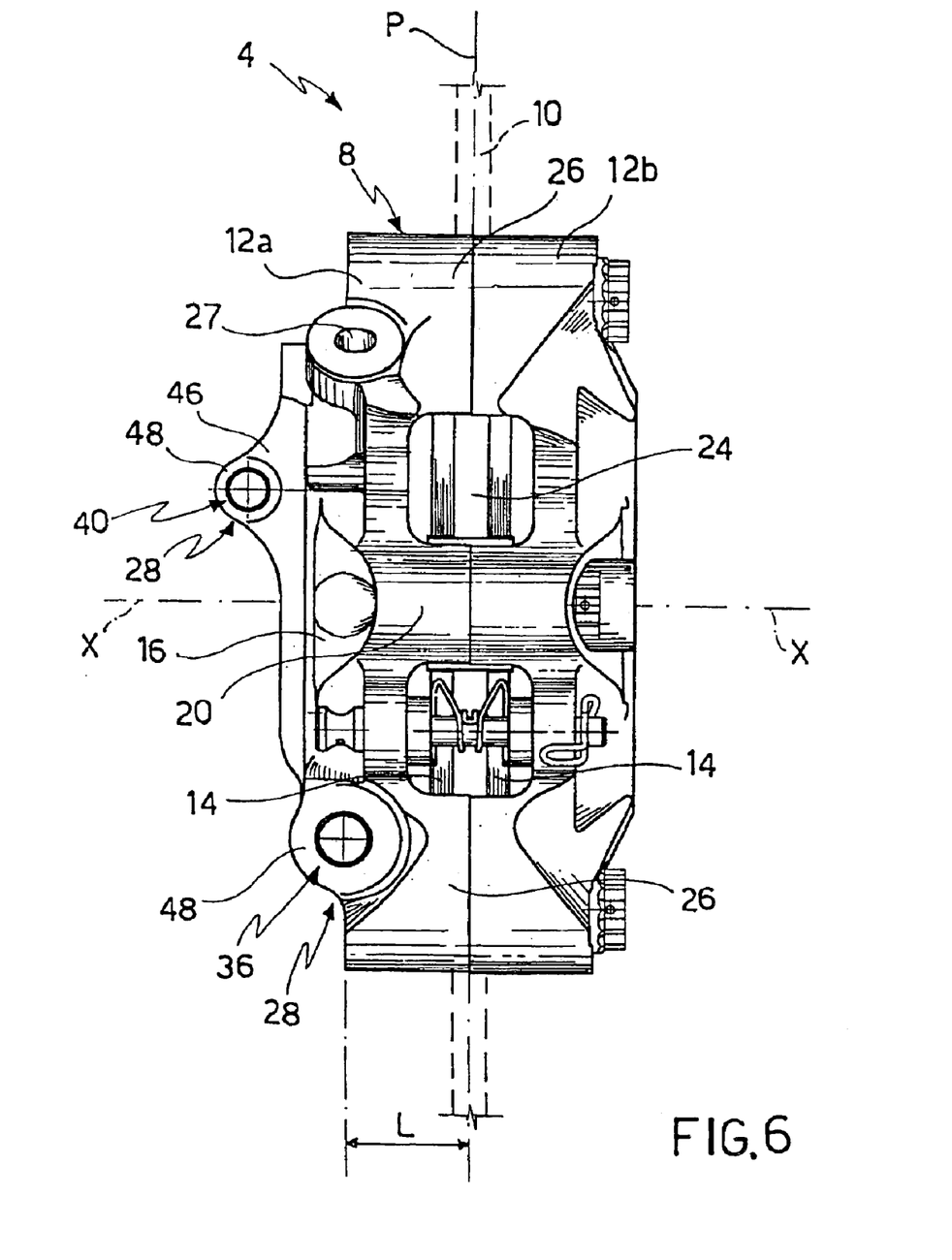
FIG. 6 is a plan view of a caliper according to a further embodiment.
Figures 7, 9:
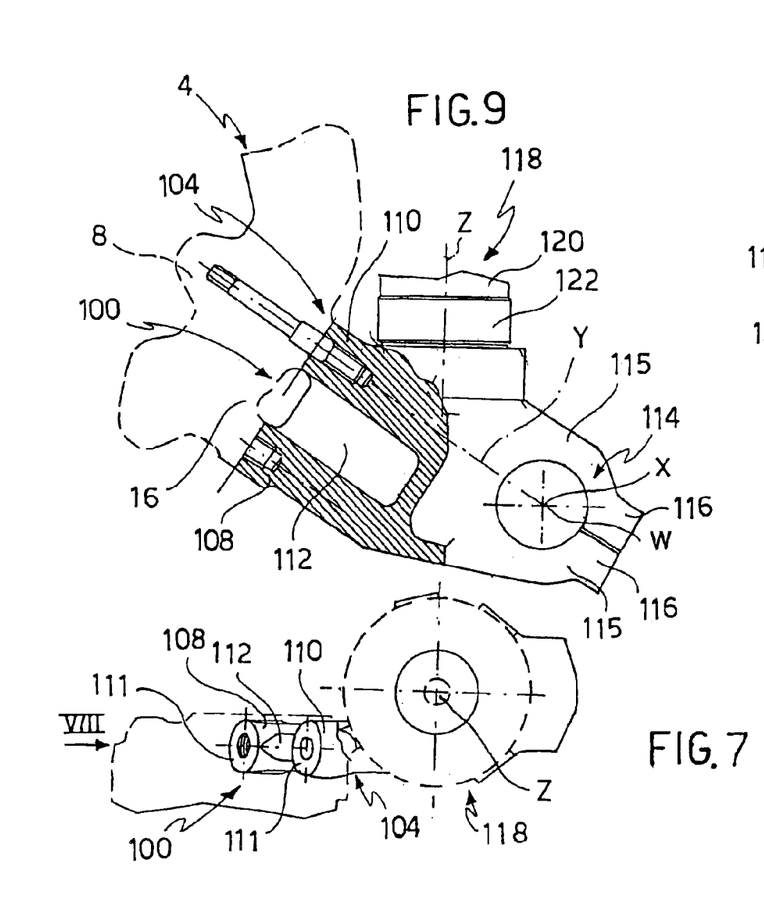
FIG. 7 is a top view of a support element according to one embodiment, viewed in the direction in which the fork extends.
FIG. 9 is a sectioned view of the support element of FIG. 8 along the line IX—IX in FIG. 8.
Figure 8:
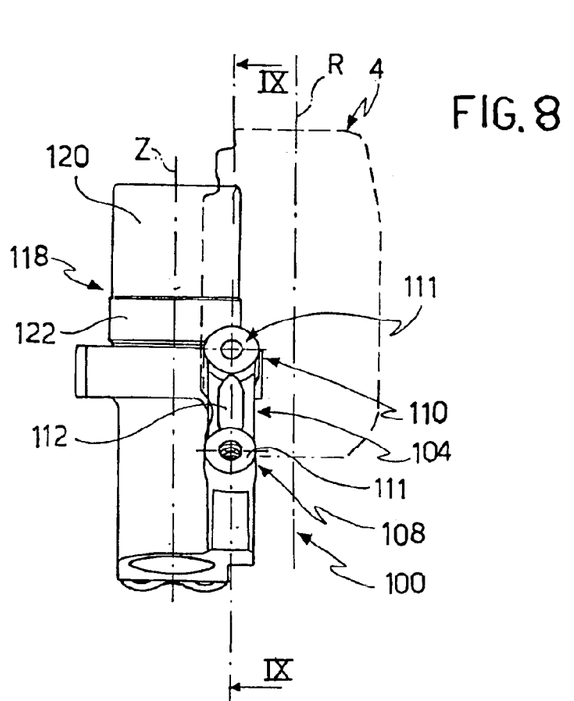
FIG. 8 is a view of the support element of FIG. 7 from the side indicated by the arrow VIII in FIG. 7.

According to a further embodiment, shown, for example, in FIG. 6, the axes S of the seats 44 of the first and second securing means 36, 40 are disposed in a plane which intersects the central plane P of the associated brake disk 10. In other words, the axes of symmetry of the first and second securing means 36, 40 are not aligned on a plane parallel with the associated brake disk 10; that is to say, relative to the central plane P of the associated brake disk 10 they have different axial spacings.

Advantageously, as shown in FIG. 6, the caliper body comprises a protuberance 46 which projects axially from a plane which is parallel with the central plane R and which extends substantially through an end of the cylinders which admits the brake fluid, in a direction opposite the central plane R. The second securing means 40, comprising a seat 44 suitable for accommodating threaded connecting means, are preferably positioned at the location of the protuberance 46.

According to a further embodiment, the first and second securing means 36, 40 along an axial direction, that is to say, parallel with the axis of rotation X of the associated brake disk 10, are contained in a portion of the caliper body 8 affected by the means that can accommodate at least one pad 22.

According to a further embodiment, the first and second securing means 36, 40 are contained in a portion of the caliper body 8 which is delimited between two planes parallel with the central plane R of the housing 11, the said planes extending respectively through an end of the thrust means or pistons 23 which faces the associated brake disk 10 and through an end of the thrust means or pistons 23 which is remote from the associated brake disk 10.

Advantageously, the first and second securing means 36, 40 are located on the fixed body element 16 in such a manner that the axes S of the seats 44 are aligned with the projections 30.

In other words, the first and second securing means 36, 40 comprise through-holes located substantially radially on the fixed body element 16 in such a manner as to terminate, at the end facing the wheel spindle, in projections 30 and bearing planes 32.

Preferably, at the location of a radial end remote from the projections 30, the first and second securing means 36, 40 comprise bases 48, for example spot-facings, suitable for receiving, in abutment, heads of threaded connecting means.

According to a further embodiment, shown, for example, in FIGS. 11 to 14, the described caliper unit 4 may be a caliper unit of the floating type. According to this construction solution, the fixed body element 16 comprises a stirrup 50 of a floating caliper for disk brakes.

The stirrup 50, in at least one of its fixed portions, constitutes an element for connecting the caliper body 8 to the support element 100. The stirrup 50 is operatively connected to the support element 100 in such a manner as to maintain a constant distance L in an axial direction parallel with an axis of rotation X of the associated brake disk 10.

Figure 13:
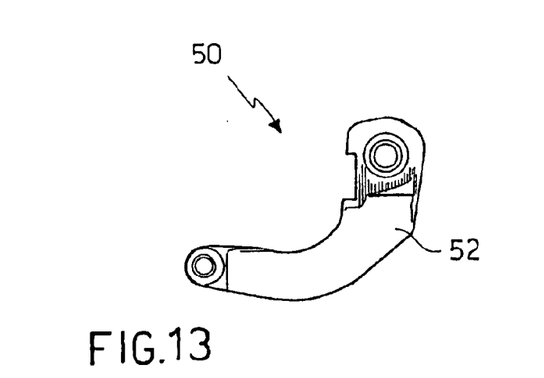
FIG. 13 is a side view of a detail of the caliper of FIG. 11.
Figure 14:
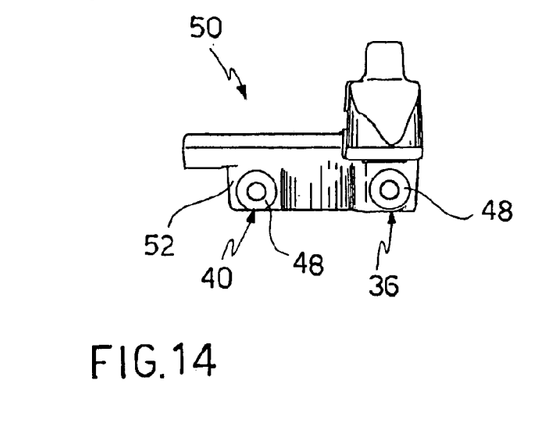
FIG. 14 is a plan view of the detail of FIG. 13.

The stirrup 50 may be either of the type that straddles the brake disk 10 or, as in FIGS. 13 and 14, it may be positioned only on one side of the brake disk 10. As in the previously described embodiment, this stirrup 50 also has at least one central portion 20 affected by the second securing means 40 and at least one end portion 26 affected by the first securing means 36. The stirrup 50 is produced in such a manner as to permit the accommodation of the securing means 28 and in such a manner as to leave an end portion 26 of the caliper (in this embodiment an end of its floating portion), not affected by the first securing means 36, substantially completely cantilevered relative to the second securing means 40.

The fixed body element 16 comprises at least one central portion 20 suitable for co-operating with means that can accommodate at least one pad 22 placed on a first side A of the brake disk 10 in order to co-operate with the brake disk 10 to exert a braking force.

The central portion 20 is located between two end portions 26 placed beside the means that can accommodate at least one pad 22.

The stirrup 50 can be associated with the support element 100 by securing means 28 which comprise first and second securing means 36, 40 located substantially in a plane perpendicular to the axial direction. The first and second securing means 36, 40 are positioned, for example, on a bracket portion 52 of the stirrup 50, the bracket portion 52 projecting from the stirrup axially in a cantilevered manner in a direction away from the plane R. The first securing means 36 are advantageously placed at the location of only one of the end portions 26 and the second securing means 40 are advantageously placed at least partially on the central portion 20 in order to leave an end portion 26, not affected by the first securing means 36, substantially completely cantilevered relative to the second securing means 40.

In a floating caliper configuration, the fixed body element comprises all of the embodiments described above in relation, for example, to the securing means 28 and to the first and second securing means 36, 40.

Both in the fixed caliper configuration and in the floating caliper configuration, a support element 100 is suitable for co-operating with the caliper body 8 in order to ensure that the caliper body 8 is secured astride the brake disk 10.

The support element 100 advantageously comprises a portion 104 for connection to the caliper body 8, the connecting portion 104, extending predominantly along an axis Y, having first and second counter securing means 108, 110 which are suitable for co-operating with the first and second means 36, 40 for securing the caliper body 8 to the support element 100 in order to support the caliper body 8 in a cantilevered manner relative to the second securing means 40.

The first and second counter securing means 108, 110 extend substantially like branches parallel with the axis Y and comprise, at the location of an end which faces the caliper body in a mounted configuration, counter-abutment planes 111 suitable for receiving in abutment the bearing planes 32 of the caliper body 8.

Advantageously, the counter-abutment planes 111 are shaped to complement the bearing planes 32 in order to produce a form-fit or a geometrical fit.

For example, according to one embodiment, the counter-abutment planes 111 comprise recesses suitable for producing a form-fit with corresponding guides present on the bearing planes 32 of the caliper body 8.

According to another embodiment, the counter-abutment planes comprise tongues suitable for producing a form-fit with corresponding recesses present on the bearing planes 32 of the caliper body 8.

Preferably, the first and second counter securing means 108, 110 comprise through-holes or blind holes which are directed substantially parallel with the axis Y and which are suitable for receiving and coupling with threaded connecting means.

Preferably, the connecting portion comprises a weight-reducing hole 112, that is to say, a pocket, between the first and second counter securing means 108, 110.

The support element 100 also comprises means 114 for connection to a spindle of a wheel and means 118 for joining to a fork which is operatively connected to the wheel spindle.

Preferably, the means 114 for connection to a spindle of a wheel comprise a "C"-shaped portion having two curvilinear arms 115 suitable for surrounding the wheel spindle at least partially, in such a manner that an axis of symmetry W of the "C"-shaped portion coincides with the axis of rotation X of the wheel spindle and of the associated brake disk 10.

Preferably, the two arms 115 terminate in two lugs 116 that face one another and that have through-holes suitable for receiving threaded connecting means for clamping the arms 115 around the wheel spindle.

According to an advantageous embodiment, in a mounted configuration of the support element 100 on the wheel spindle, an axis of symmetry Y of at least one of the first and second counter securing means 108, 110 extends through the axis of symmetry W of the "C"-shaped portion and therefore through the axis of symmetry of the wheel spindle. Therefore, when the caliper body has been mounted on the support element, an axis of symmetry of the first and second securing means 36, 40 extends through the axis of symmetry of the wheel spindle.

According to a preferred embodiment, when the caliper body has been mounted on the support element, the axis of symmetry of the second securing means 40 extends through the axis of symmetry of the wheel spindle.

Preferably, the means 118 for joining to a fork extend substantially along an axis Z and comprise a substantially cylindrical collar 120 suitable for coupling to a corresponding end portion of a fork, the collar 120 having an annular projection 122 which is preferably threaded on an outer lateral surface thereof.

According to a further advantageous embodiment, the collar 120 and the annular projection 122 form a coupling of the screw-nut type with a corresponding end portion of a fork.

Advantageously, the axis Y of the connecting portion 104 and the axis Z of the means 118 for joining to the fork form an angle of less than a quarter of a round angle, that is to say, less than ninety sexagesimal degrees.

In other words, in a mounted configuration of the support element on a front fork of a motorcycle, the portion 104 for connection to the caliper body 8 is contained completely within an angular space defined by a plane extending through the wheel spindle and parallel with the spindle, the plane sweeping angularly, in a direction opposite the direction of forward travel, the angular space from an initial position in which it is superposed on the fork to a final position in which it is parallel with a bearing plane of the wheel.

In order to mount the caliper body 8 on the support element 100, it is necessary to bring the caliper 4 close to the connecting portion 104 of the support element 100 in order to bring the first and second securing means 36, 40 of the caliper into abutment with the first and second counter securing means 108, 110 of the support element 100. It is therefore necessary to align the seats 44 of the first and second securing means 36, 40 with the first and second counter securing means 108, 110 in order to bring about locking by the insertion and tightening of the threaded connecting means, so that the caliper is mounted in a cantilevered manner relative to the second securing means 40.

When the caliper has been mounted on the support element, the caliper is in turn contained entirely within an angular space defined by a plane extending through the wheel spindle and parallel with the spindle, the plane sweeping angularly, in a direction opposite the direction of forward travel, the angular space from an initial position in which it is superposed on the fork to a final position in which it is parallel with a bearing plane of the wheel.

In other words, in a mounted configuration, the caliper is protected and covered by the fork.

As will be appreciated from the above description, the caliper described enables the disadvantages exhibited by the calipers of the prior art to be overcome.

In particular, the, caliper described is especially advantageous if mounted on the front forks of motorcycles.

In fact, the caliper described can be positioned in a location protected and shielded by the front fork of a motorcycle. Thus, the caliper is protected from any impact against stones and earth caused, for example, by the use of the motorcycle on uneven ground.

In addition, the caliper described can be mounted in a protected position also straddling small-diameter brake disks.

In particular, the caliper described is suitable for mounting on motorcycles that can be used off-road and that use not only small brake disk diameters but also provide that the rods or sleeves of the fork do not extend through the wheel spindle but, rather, are set back relative thereto in relation to the direction of forward travel.

Despite this set-back arrangement of the rods or sleeves of the fork, the caliper described here can be readily and securely fixed to the support, also being disposed in a covered and safe position.

Advantageously, the caliper described further contributes to reducing the masses that are not suspended on the front axle, and the gyroscopic effects.

In addition, the caliper described permits rigid fixing such as to ensure that the caliper and the brake disk are correctly aligned whatever the operating conditions.

Furthermore, the caliper described does not require heavy and bulky support plates in order to ensure that it is secured to the fork.

Advantageously, the caliper does not have a support element having appendages or plates that are operatively connected to the rods or sleeves of the fork. In fact, the support element is constrained on the foot or the lower or end portion of the fork. Thus, the caliper always permits anchoring not only to forks of the conventional type but also to forks of the inverted type, with the advantages that these latter involve. It will be appreciated that a person skilled in the art, in order to satisfy contingent and specific requirements, can introduce numerous modifications and variants to the calipers and the support elements described above, which would all, moreover, be contained within the scope of the invention as defined by the following claims.

What is claimed is:

1. A caliper body suitable for co-operating with a brake disk of a disk brake, the body having at least one fixed body element suitable for being connected fixedly to a support element in order to maintain a constant distance in an axial direction parallel with an axis of rotation of the associated brake disk, relative to the brake disk, the at least one fixed body element comprising at least one central portion suitable for cooperating with means that can accommodate at least one pad placed on a first side of the brake disk in order to co-operate with the brake disk to exert a braking force, the central portion being located between two end portions placed beside the means that can accommodate at least one pad; the at least one fixed body element being associated with the support element by securing means, wherein the securing means comprise first and second securing means located substantially in a plane perpendicular to the axial direction, the first securing means being placed on only one of the end portions, the second securing means being placed at least partially on the central portion in order to leave an end portion, not affected by the first securing means, substantially completely cantilevered relative to the second securing means.

2. A caliper body according to claim 1, wherein the securing means comprise bearing planes of the caliper body on the support element, which planes are suitable for receiving the support element in at least partial abutment.

3. A caliper body according to claim 2, wherein the bearing planes belong to planes parallel with an axis of rotation of the associated brake disk.

4. A caliper body according to claim 3, wherein the bearing planes of the securing means belong to the same plane parallel with an axis of rotation of the associated brake disk.

5. A caliper body according to claim 2, 3 or 4, wherein the support element comprises counter-abutment planes shaped to complement the bearing planes in such a manner that the counter-abutment planes and the bearing planes produce a geometrical fit.

6. A caliper body according to claim 5, wherein the bearing planes comprise guides suitable for producing a form-fit with recesses of the counter-abutment planes.

7. A caliper body according to claim 1, wherein at least one of the first and second securing means is disposed in a direction substantially parallel with at least one radius of the associated brake disk.

8. A caliper body according to claim 1, wherein the first securing means are located at an end portion which, in a mounted configuration of the caliper body, straddling the brake disk, is the first entered by the brake disk which rotates in the direction of forward travel.

9. A caliper body according to claim 1, wherein the second securing means are contained between two planes perpendicular to the central plane which delimit tangentially a seat of at least one thrust piston of at least one pad.

10. A caliper body according to claim 9, wherein the second securing means are contained between two planes perpendicular to the central plane which delimit tangentially part of the central portion, the said part being contained between two seats of thrust pistons of at least one pad.

11. A caliper body according to claim 1, wherein the first and second securing means comprise seats suitable for accommodating connecting elements.

12. A caliper body according to claim 11, wherein the seats are cylindrical seats having an axis.

13. A caliper body according to claim 11 or 12, wherein at least one of the first and second securing means comprises seats for screws.

14. A caliper body according to claim 11 or 12, wherein at least one of the first and second securing means comprises seats for bolts.

15. A caliper body according to claim 12, wherein the axes of symmetry of the seats of the first and second securing means are contained in a plane parallel with a central plane of the associated brake disk.

16. A caliper body according to claim 12, wherein the axes of symmetry of the seats of the first and second securing means are contained in a plane intersecting a central plane of the associated brake disk.

17. A caliper body according to claim 1, wherein the second securing means are contained at least partially between two planes that are parallel with the central plane and that delimit the at least one thrust piston of pads.

18. A caliper body according to claim 1, wherein the second securing means are contained in a protuberance of the caliper body, the protuberance projecting axially from a plane parallel with the central plane and extending through an end of the cylinders which admits a brake fluid, in a direction opposite the central plane.

19. A caliper body according to claim 1, wherein the securing means comprise threaded connection means.

20. A caliper body according to claim 1, wherein the fixed body element constitutes a semi-half of a fixed caliper for disk brakes.

21. A caliper body according to claim 1, wherein the fixed body element constitutes a portion of a stirrup of a floating caliper for disk brakes.

22. A support element suitable for cooperating with a caliper body according to claim 1, the support element comprising a portion, for connection to the caliper body, having first and second counter securing means suitable for co-operating with the first and second means for securing the caliper body to the support element in order to leave an end portion of the caliper body, not affected by the first securing means, substantially completely cantilevered relative to the second securing means, means for connection to a spindle of a wheel which can rotate about the said spindle, and means for connection to a fork which is operatively connected to the wheel spindle.

23. A support element according to claim 22, wherein, in a mounted configuration of the support element on the wheel spindle, an axis of a seat of one of the first and second counter securing means extends through the axis of rotation of the wheel spindle.

24. A support element according to claim 22 or 23, wherein the means for connection to a fork comprise a substantially cylindrical collar having an annular projection suitable for coupling to a corresponding end of the fork.

25. A support element according to claim 24, wherein the said end of a fork and the annular projection form a coupling of the screw-nut type.

26. A support element according to claim 22, wherein, in a mounted configuration on the fork, the portion for connection to the caliper body is contained entirely within an angular space defined by a plane extending through the wheel spindle and parallel with the wheel spindle, the said plane sweeping angularly, in a direction opposite the direction of forward travel, the angular space from an initial position in which it is superposed on the fork to a final position in which it is parallel with a bearing plane of the wheel.

27. A support element according to claim 22, wherein the first and second counter securing means comprise threaded seats or through-seats suitable for accommodating a bolt for anchoring the caliper body to the support element.

28. A disk brake caliper, which is produced in the form of two half-calipers, which are connected to one another, and which comprises a caliper body according to claim 1.

29. A disk brake caliper produced in a single piece, comprising a caliper body according to claim 1.

30. A disk brake comprising a disk brake caliper according to claim 28 or 29.

31. A disk brake comprising a support element according to claim 22.

* * * * *